INVENTOR
John D. Ryder.
BY
Raymond W. Junkins
ATTORNEY

Oct. 1, 1935.                    J. D. RYDER                    2,015,968
                       MEASURING AND CONTROLLING APPARATUS
                       Filed April 14, 1932          2 Sheets-Sheet 2

INVENTOR
John D. Ryder.
BY
Raymond W. Jenkins
ATTORNEY

Patented Oct. 1, 1935

2,015,968

UNITED STATES PATENT OFFICE 2,015,968

MEASURING AND CONTROLLING APPARATUS

John D. Ryder, Cleveland, Ohio, assignor to Bailey Meter Company, a corporation of Delaware Application April 14, 1932, Serial No. 605,268

31 Claims. (Cl. 236—70)

My invention relates to apparatus for measuring and/or controlling the magnitude of a variable, and particularly such variable conditions as temperature, pressure, rate of fluid flow, etc., although the variable may be of any chemical, electrical, thermal, physical or other characteristic.

According to the invention I produce an electrical effect varying in known proportion to the magnitude of a variable condition whose magnitude or variation I desire to measure or control. Such electrical effect may be a small force such as an electromotive force produced by a thermocouple and may be magnified to any desired degree.

My invention contemplates not only the amplification of minute forces but the measurement of a plurality of conditions substantially simultaneously, and the control of a variable in accordance with such measurement.

One object of the invention is to have inherent accuracy of measurement and/or control through demanding substantially no work of the effect representative of the value of the variable condition.

Another object of my invention is that either mechanical or electrical manifestations of practically any desired intensity may be periodically produced for a length of time proportional to the change in magnitude of the variable condition.

A further object is the provision that a decrease in the value of a condition may be made to effect an electrical or mechanical manifestation of greater or lesser intensity or for a shorter or longer time than for equal increase in the value of the condition, or vice versa. That is, if the magnitude of the variable departs in one direction from predetermined value, the effect produced representative of the value of the variable may be of different duration than that if the variable deviated from predetermined value in the opposite direction.

Still another object is the periodic automatic comparison with a standard of the apparatus utilized for determining the magnitude of a variable, so that over an extended period of time a high degree of accuracy is maintained.

Still another object is the provision of a plurality of responsive devices such as thermocouples which may successively be brought into cooperation with an index or record chart so that a composite record of the temperatures to which the thermocouples are sensitive may be obtained.

Still another object is the provision whereby a plurality of temperature responsive devices may separately control a variable, but all may record on the same chart for ready comparison of temperatures.

It is a still further object of my invention that a single measuring instrument may be used to measure the magnitude of a plurality of variable conditions.

Still further objects of the invention will become apparent from the drawings and description relating thereto in connection with the preferred embodiment which I have chosen as representative, and wherein variable temperatures in the operation of a heating furnace are severally measured, and one or more of which may be utilized as a control of the supply of fuel to the furnace.

Figures 1, 2:
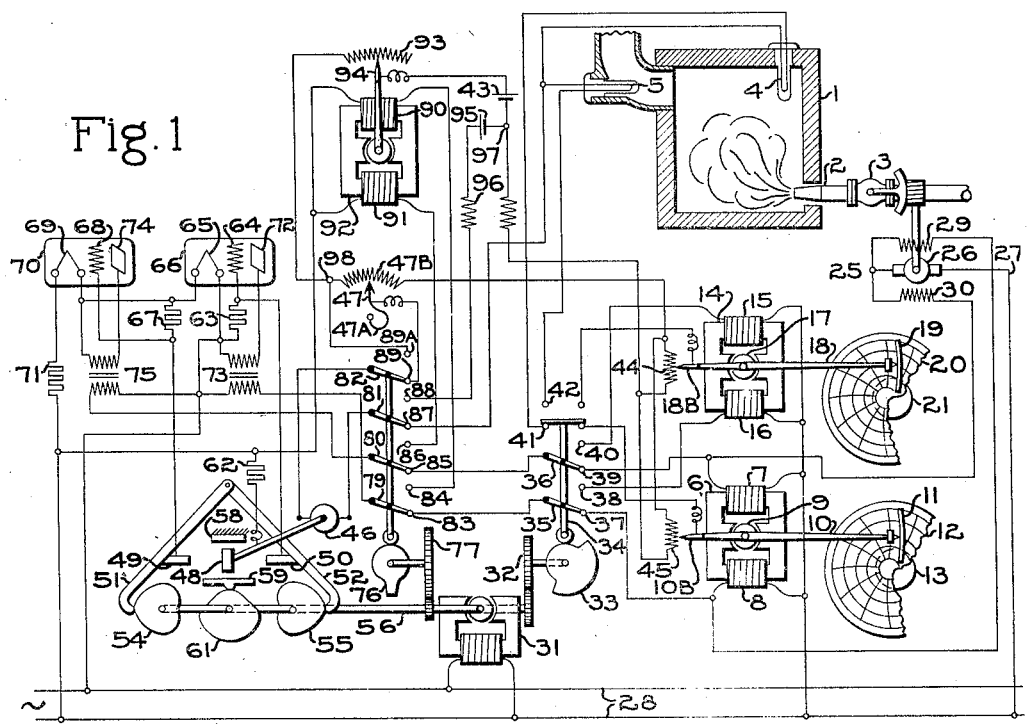
Fig. 1 is a diagrammatic arrangement of apparatus and electric circuit embodying the invention in connection with the measurement of temperatures of a furnace and the control therefrom of supply of fuel to the furnace.
Fig. 2 is a perspective view of a galvanometer controlling apparatus.

Referring first to Fig. 1, I therein illustrate an embodiment of my invention wherein certain temperatures in the operation of a heating furnace such, for example, as a metallurgical heating furnace 1, are measured for instantaneous reading on indexes and for recording upon continuous record charts. Furthermore, from the inter-relation between the value of such temperatures and predetermined temperatures I effect a control of the supply of fuel fed to the furnace 1 through a burner 2 by throttling or controlling the throttled position of a valve 3 located in the fuel oil supply line before the burner 2.

I provide a thermocouple 4 located sensitive to temperature within the furnace 1 and a further thermocouple 5 located sensitive to temperature of the exit products of combustion from the furnace in known manner.

Primarily I periodically effect an indicating and recording of the temperature at 4 and from such temperature if necessary a control of the valve 3. Alternately periodically I effect a recording or indication of the temperature at 5. Such periodicity may be so frequent that the result is substantially a continuous recording or indication of the temperatures at 4 and 5 and of substantially continuous control of the valve 3 from one of the temperatures.

The use of thermocouples for the measurement of relatively high temperatures is well known in the art, and it is equally well known that the electrical effect obtained thereby is minute and must of necessity be amplified mechanically and/or electrically to do useful work such as recording, indicating or controlling. My invention in general contemplates improved electrical circuits and apparatus in combination for causing a substantial amplification of the electrical effect of the thermocouples sensitive to and representative of the temperatures within the furnace and wherein such amplification may be utilized for remotely or locally recording, indicating and/or controlling variable factors in the operation of the furnace.

I have illustrated the thermocouple 4 as having its hot junction located within the furnace. By the term "hot junction" it is to be understood that I mean that junction of the thermocouple which is exposed to the temperature it is desired to evaluate, regardless of whether that temperature is of a greater or lesser magnitude than the room or reference temperature to which the other junction of the thermocouple circuit is normally exposed, and which I term for simplicity the "cold junction".

The electrical effect obtained through the thermocouple 4 indicative of variations in the temperature within the furnace is utilized in a potentiometer circuit, as will be explained hereinafter, for positioning of a sensitive galvanometer. A mechanically periodically actuated feeling device cooperates with the galvanometer needle for the control, upon departure of temperature from predetermined value, of thermionic or electron discharge devices whereby the minute electrical effect is amplified or magnified for the control of electro-magnetic devices such as motors which are utilized as amplified power means for positioning indicator and recording members of the temperature and also positioning the control valve 3.

I show at 6 a motor having opposed windings 7 and 8 connected in an alternating current circuit and opposedly wound in a manner such that when the windings 7 and 8 are equally energized, a rotor 9 is not urged to rotation in either direction; but when the windings are unequally energized, rotation of the rotor 9 will occur in predetermined direction. Carried by the rotor 9 for angular positioning thereby is an indicator arm 10 adapted to cooperate with an index 11 and comprising a marking means arranged to form a continuous record upon a chart 12 driven at a uniform speed by a clock motor 13. The assembly comprising the motor 6 and indicating, recording means is adapted to advise the value of the temperature to which the thermocouple 4 is sensitive.

Similarly, a motor 14 having opposed field windings 15, 16 and a rotor 17 by which is positioned an indicator arm 18 relative to an index 19 and recording chart 20, the latter driven by a clock motor 21, is adapted to advise the value of the temperature to which the thermocouple 5 is responsive.

Figure 3:
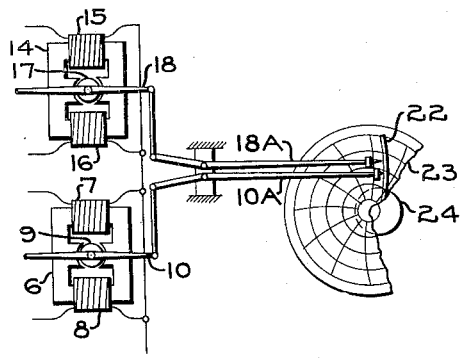
Fig. 3 illustrates a modified arrangement of recording devices of Fig. 1.

Upon every change in temperature at the thermocouple 4 I effect an angular displacement of the rotor 9 directly proportional to the variation in the thermocouple potential by substantially de-energizing one or the other of the field windings 7, 8 in a manner to be explained. Similarly, upon change in temperature at the thermocouple 5 a corresponding change in thermocouple potential results in an angular positioning of the rotor 17. At Fig. 3 I illustrate a possible modification wherein the indication and pen traces of temperature respectively at 4 and 5 are shown on a common index and common recording chart. Therein the indicator arms 10, 18 position through connecting rods the indicating, recording arms 10A, 18A adapted both to indicate relative to a common index 22 and to record simultaneously upon chart 23 driven at a uniform speed by a clock motor 24.

Further responsive to temperature at the thermocouple 4, connected in parallel with the motor 6, I show an alternating current motor 25 for positioning in desired direction and amount the fuel control valve 3. The motor 25 has a wound armature rotor 26, one brush of which is connected directly through a conductor 27 with an alternating current source 28, while the other brush is connected in series with the fields 29 and 30. The field 29 is connected in parallel with the winding 8 of the motor 6, while the field 30 is connected in parallel with the winding 7 of the motor 6. The motor 25 is generally of a type wherein if the strength of the fields 29, 30 is equal regardless of magnitude, the motor remains stationary, unurged to rotation in either direction; whereas if the strength of one of the windings 29, 30 predominates over that of the other winding, the motor will rotate in predetermined direction.

It will be observed that the arrangement is such that when temperature at the thermocouple 4 varies, an electromotive force of minute value will be set up in the thermocouple circuit, which through proper means to be hereinafter described, I amplify for the control of rotation in amount and direction of the motors 6 and 25 for indicating and recording the temperature at 4 as well as controlling the fuel supply valve 3 from such temperature.

In connection with the thermocouples 4, 5 and motors 6, 14, 25 I utilize a single galvanometer and feeler device whereby I periodically and alternately make effective the thermocouple 4 for positioning the motor 6 and motor 25, and alternately make effective the thermocouple 5 for positioning the motor 14 if such positioning of the several motors is dictated through variation in the respective thermocouple temperature. For such periodic switching I provide a constant speed alternating current motor 31 connected directly across the alternating current source 28 driving through suitable gearing 32 a constantly rotating cam 33 for periodically opening and closing certain circuits. On the drawings I illustrate a switch bar 34 having a roller at its lowermost end and adapted to rise and fall vertically through engagement of the roller with the cam surface upon rotation of the cam. Pivotally fastened to the bar 34 are switch members 35, 36, one end of each of which is pivotally connected to a terminal point while the other end of each is adapted to be moved respectively from contact terminal 37 to 38, and 39 to 40. Further connected to and carried by the bar 34 is a rigid contact bar adapted to close-circuit between the contacts 41 or the contacts 42, dependent upon whether the bar 34 is in its lowermost or uppermost travel position.

Vertical reciprocation of the bar 34 through periodic rotation of the cam 33 accomplishes a periodic switching whereby the motor 6 and with 4, and alternately the motor 14 is susceptible to conditions indicated by thermocouple 5.

By this switching arrangement I am able during alternate periods to indicate and record the temperature at the thermocouple 4 as well as to control therefrom the rate of supply of fuel through the burner 2 in accordance with temperature, and during sucessive alternate periods to indicate and record substantially simultaneously with the furnace temperature the temperature of the gases of combustion leaving the furnace at the thermocouple 5. I accomplish such multiple measuring and controlling from a plurality of thermocouples or other delicate sensitive devices for producing minute electrical effects through the utilization of a single intermediate apparatus, namely a single galvanometer and feeler mechanism.

In the circuit of the thermocouples 4, 5 I utilize the well known zero balance or null method. In accordance with this method the potential developed by the thermocouple is balanced against the fall of potential through a portion of a slide-wire potentiometer or resistance of known length and value per unit of length. Upon a change in potential developed by the thermocouple, a galvanometer in the circuit indicates by its needle swing a departure from balance and effects indirectly a movement on the slide-wire potentiometer whereby a balance of potential is effected. The physical position of the contact point of the slide-wire potentiometer may be utilized as an indication of temperature equivalent to the potential across the thermocouple.

Such is the system in general which I employ. A constant drop in potential is maintained across the slide-wire potentiometer resistance by means of a suitable current source, and it is evident that the amount or length of resistance necessary to balance the potential generated by the thermocouple will then be proportional to that potential and may by suitable calibration be used to determine its magnitude and correspondingly the magnitude of the temperature to which the thermocouple is susceptible. In Fig. 1 I provide such a potentiometer circuit essentially comprised of a current source battery 43 connected in series with slide-wire potentiometers 44, 45, the latter connected in parallel with each other.

As shown in Fig. 1, a galvanometer diagrammatically indicated at 46 is connected in series with the thermocouple 4, and they together span that part of the potentiometer circuit between contact arm 10B and a contact arm 47 of a cold junction compensator, later to be described. The contact arm 10B comprises an extension of the indicator arm 10 insulated therefrom and adapted to frictionally engage along the slide-wire resistance 45 upon angular positioning of the rotor 9. The contact arm 47 is secured to a bimetallic spiral 47A and adapted to frictionally engage along an auxiliary slide-wire resistance 47B. When the difference in potential through that part of the potentiometer circuit between the arms 10B and 47 is equal to that developed by the thermocouple 4, the galvanometer needle 48 will remain stationary midway between two movable contacts 49 and 50 as shown.

Upon a variation in temperature within the furnace, resulting in a corresponding increase or decrease in the potential difference developed by the thermocouple 4, the galvanometer needle 48 left on the drawings an amount substantially proportional to the variation in temperature. Upon such a deflection of the galvanometer needle 48, periodically, engagement will be made between the galvanometer needle and either the contactor 49 or the contact 50, with the result that rotation of the rotor 9 and simultaneously of the rotor 26 will be effected in the proper direction to move the indicator 10 to read the new temperature, to position the fuel supply valve 3 for variation in the supply of fuel, and to move the contact arm 10B along the slide-wire resistance 45 until the difference of potential through that part of the potentiometer circuit between the contact arms 10B and 47 is again equal to that developed by the thermocouple. It is evident that the amount of movement of the arm 10B will then be proportional to the change in temperature within the furnace, and accordingly a true indication of the new temperature will be accomplished on the chart 12 and relative to the index 11. Simultaneously the supply of fuel to the furnace will be varied in amount and direction, whereby the heating of the furnace will be corrected, to tend to return the temperature at the thermocouple 4 to predetermined desirable value.

Periodically the switch bar 34 will be reciprocated through the agency of the cam 33 to open-circuit the contacts 41 and close-circuit the contacts 42, whereby the galvanometer will be susceptible to potentials developed by the thermocouple 5 instead of to those developed by the thermocouple 4, as previously explained. Simultaneously the switching of the contact arms 35, 36 from contact points 37, 39 to 38, 40 respectively will connect the circuits to record and indicate the temperature at the thermocouple 5 upon the index 19 and chart 20.

With the thermocouple 5 so connected to the galvanometer 46, the potential difference developed by that thermocouple will be compared to the drop in potential through that portion of the potentiometer circuit between the point of contact of an arm 18B frictionally engaging the slide-wire resistance 44 and the arm 47. As described with reference to the thermocouple 4, if the potential difference at the thermocouple 5 is equivalent to the difference of potential through that portion of the potentiometer circuit so spanned, the rotor 17 of the motor 14 will remain stationary. If, however, these potential differences are of unequal magnitude, then the rotor 17 will be angularly positioned in the proper direction and amount to urge the indicator arm 18 to new position relative to the index 19 and the chart 20, and simultaneously move the contact arm 18B along the slide-wire resistance 45 until equilibrium of potentials is again restored.

In Fig. 2 I have shown in perspective the mechanism more or less diagrammatically shown in Fig. 1 through whose agency I am enabled to periodically transmute the mechanical manifestations of the galvanometer needle of changes in potential generated by the thermocouple connected thereto into electrical manifestations of constant magnitude, but which continue for an increment of time proportional to the mechanical manifestation of the galvanometer needle. This electrical manifestation I then use to control the energization of the motor windings of the motors 6 and 14, or 25, depending upon which thermocouple is then connected to the galvanometer.

Referring now in particular to Fig. 2, members at 53 are periodically moved toward and away from each other by the agency of similar but oppositely positioned cams 54, 55, rigidly attached to a shaft 56 rotated at constant speed by the continuously operating motor 31. The scissor bars 51, 52 are provided at their lowermost ends with rollers, the one riding the surface of the cam 54 and the other the surface of the cam 55, and the scissor bars further carry respectively the contacts 49, 50 insulated therefrom and from each other.

The galvanometer 46 as shown is of the suspended type and properly located relative to a permanent magnet 57. Normally the needle 48 of the galvanometer is free to deflect in accordance with the difference of potentials generated by the source to which the galvanometer is connected, and that portion of the potentiometer circuit spanned. Periodically, however, the needle 48 is clamped between a stationary portion 58 and a movable bar 59 which is pivoted at some point 60. The pivoted portion carrying the movable bar 59 is reciprocated or angularly moved relative to the pivot 60 by means of a constantly revolving cam 61 secured to the shaft 56. Thus periodically upon each revolution of the cam 61 the needle 48 will be clamped lightly between the stationary member 58 and the movable reciprocating bar 59 and for a portion of each revolution of the cam 61.

Immediately after the needle 48 has been so clamped, the position of the cams 54, 55 relative to the cam 61 is such that the scissors arms 51, 52 move toward each other. When, as shown, the galvanometer needle 48 is in mid-position, indicating a balance between the two potentials, the scissors arms 51, 52 will follow the complete periphery of the cams 54, 55 and neither the contacts 49, 50 will engage the needle 48. However, if the needle is deflected through action of the galvanometer 46 either to the right or to the left, then the adjacent scissors arm will follow the periphery of the associated cam until the contact carried by the scissors arm reaches the needle. Further motion of this scissors arm toward the other will then be prevented by the galvanometer needle, and the engaged contact will remain in engagement with the needle until the scissors arm is again picked up by the associated cam and moved away. At a predetermined definite point in the outward travel of the scissors arms, the galvanometer needle 48 will be released from clamping engagement and be free to deflect either further away or return toward the predetermined neutral position, and until it is again clamped as the scissors arms travel toward each other on the next cam cycle of revolution.

It is evident that by proper shaping of the cams 54, 55, the length of time the scissors arms are in contact with the needle 48 may be made directly proportional to the amount of deviation of the needle from the mid-position, which in turn is proportional to the difference of the opposed potentials. If desired, one of the cams, for example, 54, may be made of a different shape than the other cam, for example 55, whereby the length of contact for a given deflection of the galvanometer needle in one direction may be made different from that for the same amount of deflection of the galvanometer needle in the opposite direction. It is further evident that the cams 54, 55 may be made of any desired shape so that the length of engagement between the contacts carried by the scissors arms and the galvanometer needle may bear any desired functional relation to the amount of deviation from the neutral or mid-position of the galvanometer needle.

I utilize the feeling and clamping apparatus just described to produce an electrical effect bearing definite relation to the d———

———
motor
electrical force ———
of the galvanometer needle —— ———
contact 49 or the contact 50 I interpose electron discharge devices or thermionic valves for controlling an amplified or substantially greater electrical force to be directly applied to the motors mentioned. Certain features of the motor control circuits including the electron discharge devices are described and claimed in my copending application Serial No. 605,267 filed of even date, herewith, and having the same assignee. I will now explain the functioning of this appara[tus in] sufficient detail to be understand[ed in connec]tion with the present ap[paratus. It] will be understood th[at ———] trated and des[cribed ———] aforemention[ed ———]

Ref[erence ———]
nee[dle ———]
alte[rnating ———]
resist[———]
the con[tact ———]
lation maint[ained ———]
as the resistance [———]
ode 65 of an electr[ic ———]
shown as a thermionic [———]
galvanometer needle is ad[just]ment with the contact 49 t[———]
potential relation maint[ained ———]
device shown as a res[istor ———]
68 and a cathode 69 [———]
Current for heat[ing ———]
are connected in [———]
nating current s[———]
The plate or ano[de ———]
to the cathode 65 [———]
is provided with [———]
transformer 73. [———]
vice 70 is connec[ted ———]
through an outpu[t ———]
from the secondar[y ———]

The devices 66, [70 ———]
current flows from [———]
lated cathode 65, 69 [———]
is applied to the de[vice ———]
current or one-half c[———]
wave passes through [———]
the device is conducting [———]
galvanometer needle 48 [———]
neither the contacts 49, 50 [———]
of each alternating curre[nt ———]
anodes of the devices 66, [———]
potential with respect to [———]
potential relation between th[———]
will be such as to allow passage [———]
the output circuits comprising [———]
of the transformers. During the [———]
cycle of the alternating current wave, the pot[ential] of the plates of the two devices 66, 70 will be negative with respect to the potential of their respective cathodes, thereby open-circuiting the output circuit of the devices. Thus a unidirectional half cycle or pulsating direct current will flow through each of the devices 66, 70 when they are respectively conducting.

If now the galvanometer needle deflects either to the right or to the left due to a change in temperature and corresponding change in thermocouple potential, and for a period of time proportional to the change in temperature as hereinbefore described, it will engage either the contact 50 or the contact 49. Under this condition, and for the period of engagement the normal potential relation between the cathode and grid of the device 66 or the device 70 according as to whether the contact 50 or the contact 49 is engaged, will be changed. During that portion of the alternating current cycle when the associated device was normally adapted for passage of uni-directional current, the grid will now be sufficiently negative with respect to its cathode that the output circuit of the device will be open-circuited. During the remaining portion of the alternating current cycle, notwithstanding that the grid will have a positive potential with respect to the potential of the cathode, the device will remain open-circuited inasmuch as the plate will be under a negative potential with respect to the potential of the cathode.

It will therefore be seen that with the galvanometer needle 48 engaging neither of the contacts 50, 49, there will be a uni-directional current flow through the devices 66, 70 and correspondingly through the secondaries of the transformers 73, 75; but with engagement between the needle 48 and either the contact 49 or the contact 50, one or the other of the devices 66, 70 will be open-circuited for the period of such engagement of contacts.

As illustrated in Fig. 1 the field 7 of the motor 6 and the field 30 of the motor 25 are in parallel connected through the contact point 39, the switch finger 36 to the primary of the transformer 75; while the field 8 of the motor 6 and the field 29 of the motor 25 are connected in the primary circuit of the transformer 73. Periodically upon rotation of the cam 33, this condition is switched, and the field 16 of the motor 14 is connected in the primary circuit of the transformer 75, while the field 15 of the motor 14 is connected in the primary circuit of the transformer 73.

As is well known and additionally brought out in the co-pending application previously referred to, the impedance of the primary of a transformer is dependent upon the current flowing in the secondary winding; thus the impedance of the primary of a transformer whose secondary winding is open-circuited is relatively great compared to a similar transformer whose secondary winding is close-circuited. In my invention I make use of this principle, as under normal conditions a pulsating direct current will pass through the output circuit of the thermionic discharge devices which will be of sufficient value to reduce the impedance of the primary windings of the transformers 73, 75 so that the opposed fields of the connected motors will be energized to a substantially normal amount. Inasmuch as the opposed fields of each motor are energized equally, then due to the characteristics of the motors as previously described, the rotors will not be urged to rotation in either direction.

However, upon rendering one of the devices 66, 70 non-conducting, a corresponding change in impedance of the primary of the related transformer will vary the strength of the connected field windings and the motor will be allowed to rotate in one direction or the other.

Upon a variation in temperature as indicated by a change in thermocouple potential and corresponding movement of the galvanometer needle, for an increment of time proportional to the change in temperature, a circuit will be closed, changing the normal potential relation between the grid and cathode of one of the thermionic discharge devices and thereby open-circuiting the output circuit of that device. The impedance of the primary of the transformer having its secondary connected in that output circuit will then be increased to such a value as to substantially deenergize the field of the related motor or motors, and inasmuch as the other field of the respective motor will be normally energized, rotation of the motor in desired direction will ensue.

It will of course be evident that if the galvanometer needle 48 departs from neutral position in one direction it will engage the contact 50 through a portion of the cycle of the cam 55 whereby for a portion of each period the discharge device 66 will be rendered non-conducting and the field 8 of the motor 6 as well as the field 29 of the motor 25 be correspondingly weakened relative to the fields 7 and 30. When this occurs the rotor 9 and the rotor 26 will be angularly positioned in desired direction so that the indicator arm 10 will indicate relative to the index 11 and the recording chart 12 the value of the new temperature and the motor 25 will operate the valve 3 for control of fuel supplied to the furnace. Should the galvanometer needle 48 be deflected in the opposite direction, then its engagement with the contactor 49 will effect an open-circuiting of the discharge device 70, and with corresponding change in the impedance of the primary of the transformer 75, the field 7 and the field 30 will be weakened, whereby the rotor 9 and the rotor 26 will be caused to rotate in the opposite direction.

Upon periodic rotation of the cam 33 and reciprocation of the switch bar 34, the temperature at the thermocouple 5 will be recorded upon the chart 20 and indicated upon the index 19 through the agency of the same galvanometer, feeler mechanism, and thermionic discharge devices.

Such positioning of the rotors 9 and 17 will, as hereinbefore explained, move the related contact arms 10B and 18B along the slide-wire potentiometers 45 and 44 respectively, thereby balancing the relation of potentials wherein when such balance is reached, the galvanometer needle 48 will have returned to its neutral position wherein upon reciprocation of the cams 54, 55, 61, no engagement of the needle with the contacts 50, 49 will occur and no further change in the indication, record or control will take place until the next deviation of temperature.

Through the relation of speeds between the shaft 56 and the cam 33 I may arrange for alternate cycles of the cam 61 to find the galvanometer needle 48 positioned by the same thermocouple. That is, with one revolution of the cam 33 for every two revolutions of the cam 61, so that the cam 61 will make one complete revolution, thereby clamping the galvanometer needle 48 when the needle is positioned responsive to thermocouple 4 and upon the next revolution of the cam 61 it will clamp the galvanometer needle 48, then positioned responsive to the temperature at the thermocouple 5. If, however, I make proper changes in the gears 32, I may have two successive actuations of the temperature from the thermocouple 4 and then one from the thermocouple 5, or have them related in any desired manner.

One primary advantage of the arrangement I have illustrated and described is that through the use of entirely separate indicator arms 10, 18 I alternately make one of the arms effective for moving to a new position if necessary and leave the other in its last moved position. Thus assuming that the temperature at the location 4 has changed only a slight amount through the intermediate time during which the temperature at 5 was being observed, the rotor 9 will have only a slight amount of positioning to accomplish. Now if a single indicator or recorder arm were used, and alternately connected to be responsive to the temperatures 4 or 5, then the difference between such temperatures might be considerable, and an appreciable amount of actuation necessary to move from one pen trace to the other upon alternate periods.

Furthermore, rather than having the two pen traces on one chart as performed by a single pen, or a series of dots as is common at the present time, I have two complete pen traces.

As is well known, the potential developed by a thermocouple is dependent not only upon the temperature to which the hot junction is exposed, and which temperature it is desired to evaluate, but also upon the temperature of the cold junction. One feature of my invention lies in the novel method I propose for compensating for variations in cold junction temperature from calibration temperature. I am aware that several means have been proposed for obtaining the necessary compensation, all of which have proven to be either inaccurate or highly expensive to construct. The means which I have provided is simple to construct and of a high degree of accuracy. I am further aware that it is old in the art to insert in the potentiometer circuit a resistance having a high temperature coefficient with respect to the other resistances in the circuit; the fall of potential across the last-named resistance compensating for the variations of the electromotive force produced by the thermocouple through changes of temperature of the cold junction; or to super-impose upon the potential generated by the thermocouple a second potential of sufficient magnitude to compensate for variations in the cold junction temperature.

Both of these methods are unsatisfactory, however. The former method introduces an error, inasmuch as the method of determining the magnitude of a potential by a potentiometer is predicated on the principle that the current in the potentiometer circuit is maintained absolutely constant, and the second method introduces the necessity of another source of potential and further complicates the circuit. The means I have devised for compensating for variations in cold junction temperature is of simple construction and does not in any way impair the accuracy of the potentiometer method of measuring potentials.

In accordance with my improved method I automatically add to or subtract from the potentiometer potential against which is balanced the thermocouple potential, an amount equal to the change in the thermocouple potential due to a variation in the temperature of the cold junction.

Referring to Fig. 1 I show the contact arm 47 carried by a bi-metallic spiral 47A and adapted to engage a slide-wire resistance 47B connected in the potentiometer circuit. Upon a variation in the temperature of the cold junction of the thermocouple, to which temperature the bi-metallic spiral is exposed, the contact tip 47 will be moved along the resistance 47B to vary the potentiometer potential impressed on the thermocouple. For example, assume the temperature of the hot junction of the thermocouple 4 to remain constant; upon an increase in temperature of the cold junction, reducing the thermocouple potential, the bi-metallic spiral will move the contact arm 47 along the resistance 47B until the difference in potential between the point on the slide-wire resistance 47B previously engaged by the contact arm 47 and the point on the resistance 47B now engaged by the contact arm is equal to the drop in potential generated by the thermocouple due to the rise in cold junction temperature. Regardless, then, of changes in cold junction temperature, the galvanometer needle will remain in the mid-position unless there is a change in the hot junction temperature, and the indicator arms 10 and 18 will be positioned only in response to changes in the hot junction temperature of their associated thermocouples.

The accuracy of a potentiometer may be materially affected through change in the potential drop across the resistance. It is desirable, then, to periodically standardize or compare the potential drop through the slide-wire resistance with a standard drop or a differential of potential of known value.

In this connection I provide a constantly rotated cam 76 driven at proper speed through the gearing 77 from the shaft 56. The gear ratio may be such that the cam 76 makes one revolution to several revolutions of the cams 61, 54, 55, 33.

In engagement with the cam surface 76 is one end of a switch bar 78 pivotally fastened to which are contact fingers 79, 80, 81, 82, each pivoted separately externally relative to the switch bar 78 in a manner such that reciprocation of the bar 78 through rotation of the cam 76 will cause a vertical reciprocation of one end of each of the contact fingers. Such reciprocation will cause that end of each contact finger to move from one contact to another so that alternately certain circuits are close-circuited, and at alternate intervals other circuits are close-circuited.

I illustrate in Fig. 1 the switch member 78 in its lowermost travel position, wherein the contact finger 79 connects the primary of the transformer 73 with contact finger 35, contact finger 80 connects the primary of the transformer 75 with contact finger 36, contact finger 81 connects one side of the galvanometer 46 with the thermocouples 4 and 5, and the contact finger 82 connects the other side of the galvanometer 46 with the contact arm 47.

Upon rotation of the cam 76 to position 180 degrees to that shown in Fig. 1, the just mentioned circuits are open-circuited and the primaries of the transformers 73, 75 are connected directly respectively to field windings 90, 91 of a motor 92, while the galvanometer is connected at one terminal with a variable resistance 93 and at the other terminal with the contact finger 94 of the resistance 93 through a power source 95 and the battery 43.

Once during each revolution of the cam 76 the galvanometer is disconnected from the thermocouples, as well as from the cold junction compensator, and is connected directly across the resistance 93 and power sources 43, 95. Its operation connects the galvanometer through a suitable resistance 96 to the standardizing cell 95 and to the potentiometer circuit, bypassing the resistance 47B. The potential of the potentiometer circuit between the junction points 97 and 98 is then impressed on the galvanometer in opposition to the potential of the standard cell 95.

Unless these potentials so impressed on the galvanometer are of equal magnitude, indicating a definite predetermined difference of potential between the junctions 97, 98, the galvanometer will deflect in direction and amount dependent upon the preponderance of one potential over the other, and therewith in a manner as described with reference to the operation of the motors 6, 14 and 25, the motor 92 will be periodically operated for increments of time proportional to the amount of deflection of the galvanometer needle to vary the amount of the resistance 93 in the potentiometer circuit until the desired difference in potential exists between the junctions 97 and 98, when the potentials impressed on the galvanometer will be of equal magnitude and the galvanometer needle will be in the mid-position.

Usually the differential in potential existing between the junctions 97, 98 can be brought to the desired value during one cycle of operation of the scissors arms 51, 52, as I prefer to make the comparison frequently enough to eliminate all but very minute changes in the difference in potential desirably maintained across the slide-wire resistance. However, it is apparent that by changing the length of the raised portion of the cam 76 I may maintain the switch members in engagement with the contacts 84, 86, 88 and 89A for any desired number of cycles of operation of the scissors arms 51, 52.

Figure 4:
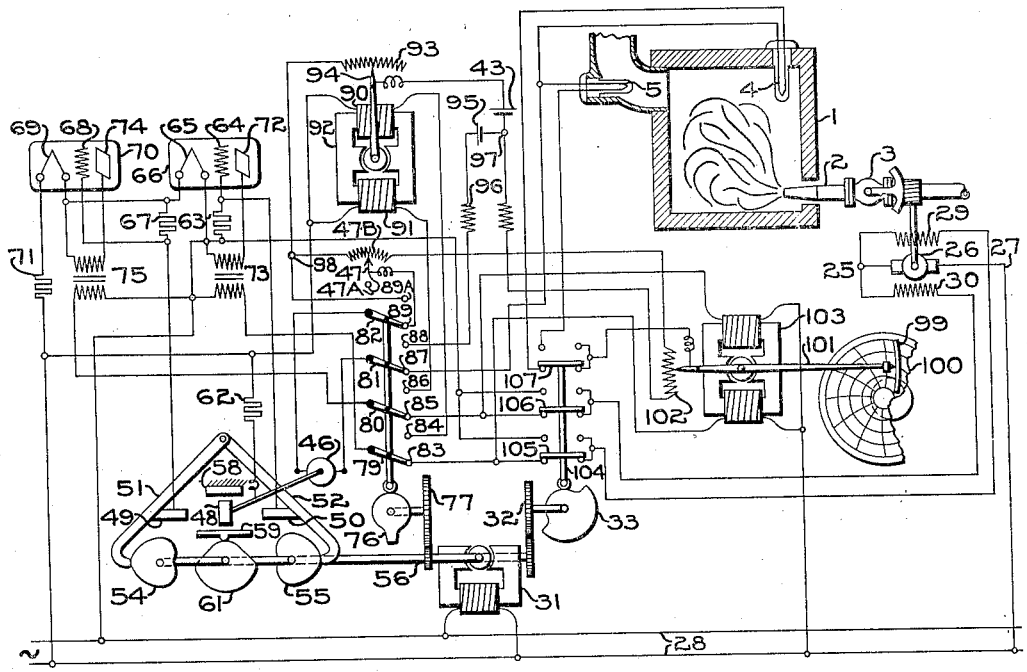
Fig. 4 is a diagrammatic arrangement of apparatus and circuit embodying a modification of the arrangement of Fig. 1.

In Fig. 4 I illustrate an embodiment of my invention providing for the possibility of indicating on a single index 99 and recording on a single chart 100, with a single indicator marking pointer 101, alternately the temperatures at the thermocouples 4 and 5 through periodically moving the pointer 101 from a point corresponding to the temperature at one thermocouple to a point corresponding to the temperature at the other. The resulting graph on the chart 100 will in effect be a band, the outermost points forming two curves, one representative of the temperature at one location, and the other representative of the temperature at the other location.

Simultaneously with the recording of one of the temperatures I energize the motor 25 for control of the fuel admission valve 3 and alternately, when the indicator arm 101 is positioned responsive to the other temperature, I lock the motor 25 against rotation.

The arrangement illustrated in Fig. 4 provides a ready means for showing a continuous graph of difference between two temperatures in the operation of apparatus, and simultaneously controlling to maintain one of the temperatures at predetermined value. I may arrange the circuits and circuit control so that the control of the fuel admission valve 3 will be simultaneous with the indication of either of the temperatures at 4 or 5, as desired.

The pyrometer and potentiometer circuits are the same in Fig. 4 as in Fig. 1, except that herein I utilize but one slide-wire resistance 102 in series with the battery 43. I utilize the same arrangement of galvanometer and feeler mechanism, and amplify the galvanometer movement effect through the agency of thermionic discharge devices 66, 70 as well as transformers 73, 75 for control of a motor 103 whose angular positioning serves to position the indicator arm 101 as well as the contact arm engaging the slide-wire resistance 102.

Driven by the continuously rotating shaft 56 I show the cam 33 for periodically vertically positioning a switch member 104, reciprocating it between two extremes of travel, wherein at each extreme certain circuits are closed for switching in effect from thermocouple 4 to thermocouple 5. Carried by the switch member 104 are contact bars 105, 106 and 107.

In the position shown in Fig. 4, wherein the switch member 104 is in its lowermost position, circuit is closed between the primary of transformer 73 and one of the field windings of motors 25, 103 in parallel. Circuit through the contact bar 106 is completed between the primary of the transformer 75 and the other field coils of the two motors in parallel. Circuit is completed by the contact bar 107 between the thermocouple 4 and the contact arm carried by the motor 103 in engagement with the slide-wire resistance 102. Thus in the shown position of connection, the indicator 101 and the motor 25 are positioned responsive to temperature at the location of the thermocouple 4.

When the cam 33 revolves until the switch member 104 is reciprocated to its other extreme of travel, the just mentioned circuits are disengaged and new circuits completed. Contact bar 105 and contact bar 106 connect the two fields 29 and 30 of the motor 25 together and in series across the alternating current power source 20, while contact bar 107 connects the thermocouple 5 to the contact bar engaging the slide-wire resistance 102. The indicator 101 is then responsive to temperature at the location of the thermocouple 5, and the motor 25 is not urged to movement in either direction. The fields 29, 30 of the motor 25 being connected in parallel with each other and in series with the armature 26 across the power source, energize the field equally for imparting to the armature equal opposing torques whereby the motor 25 is in effect locked against rotation in either direction.

If the difference between the temperatures to which the thermocouples 4 and 5 are subjected is small, it is evident that the period of time each thermocouple is in cooperation with the potentiometer circuit may be made relatively short compared to the length of period necessary if the difference is of a relatively greater magnitude. However, by proper selection of the gears 32, 77 the period of time may be extended to include any desired number of complete cycles of operation of the scissors arms 51, 52.

While I have shown only two temperature responsive devices such as the thermocouples 4 and 5, it will be understood that the invention contemplates the use of a plurality of such devices, for substantially any desired number may be utilized with proper switching arrangement and to record on a single or separate charts and indicate on single or separate indexes as may be desired. Furthermore, while I have illustrated the invention as relating particularly to the measurement of temperature and the use of thermocouples, still I contemplate that the arrangement may be utilized for the measurement and control of other variables or characteristics in the operation of apparatus, and which may be of physical, chemical, thermal, electrical or other nature. Such variables might be flow, temperature, pressure or ratio of variables, etc.

While in the description and appended claims for the sake of simplicity and clearness I have used the terms "slide-wire resistance" and "slide-wire potentiometer", it is to be understood that I include in this term any variable resistance capable of performing the same function.

So far as the feeler and amplifying mechanism is concerned, it is not necessary that the movable portion illustrated as the galvanometer needle 48 be the movable portion of a galvanometer, but such movable part might be positioned by a Bourdon tube sensitive to pressure or temperature, or by the indicator arm of a fluid flow meter, or by any similar device having a relatively small available power which is desirably amplified for recording, indicating or control therefrom, and wherein electrical effects may be produced in amplified form of constant magnitude, but of duration or for percentage of period of operation, dependent upon the amount of departure of the variable from a predetermined value.

While I have illustrated and described certain preferred embodiments of my invention, it is to be understood that I am not to be limited thereby except as to the claims in view of prior art.

What I claim as new, and desire to secure by Letters Patent of the United States, is:

1. A temperature measuring apparatus comprising in combination, a plurality of electron discharge devices each provided with an input and an output circuit, temperature responsive means for controlling energization of the input circuits, a movable member for advising temperature magnitude, and electro-magnetic means for exerting opposing forces on said member, the energization of said electro-magnetic means controlled by the current in said output circuits.

2. A temperature measuring device comprising in combination, a plurality of electron discharge devices each having an input and an output circuit, temperature responsive means for controlling energization of the input circuits, a motor having a rotor and a plurality of electro-magnetic windings for exerting opposing forces on said rotor responsive to the current in said output circuits, and an indicator of temperature positioned by the rotor.

3. A temperature measuring device comprising in combination, an electron discharge device having an input and an output circuit, temperature responsive means for controlling the energization of the input circuit, a transformer, the secondary of the transformer connected in the output circuit of the electron discharge device, a movable member for indicating temperature magnitude, and electro-magnetic means for positioning such movable member, the primary of the transformer connected in the circuit of said electro-magnetic means.

4. A temperature measuring device comprising in combination, a plurality of electron discharge devices each provided with an input and an output circuit, temperature responsive means for controlling the energization of the input circuits, a plurality of transformers, a movable member whose position indicates the magnitude of temperature, electro-magnetic means for exerting opposing forces upon said movable member for positioning the same, a source of alternating current for said electro-magnetic means, the primary windings of said transformers connected in circuit with said electro-magnetic means, the impedance of the primary windings of the transformers controlling the flow of the current from said source to said electro-magnetic means, and the secondaries of said transformers connected in the output circuits of said electron discharge devices and providing a source of alternating current supply for the output circuits.

5. In combination with an electric circuit, electro-magnetic means connected in said circuit, a source of alternating current for the circuit, a second circuit, an electron discharge device having a grid, a cathode and an anode, the anode and cathode of said device connected in said second-named circuit, means for maintaining a normal potential relation between said grid and cathode, temperature sensitive means for changing said relation, an inductive coupling between said first and second-named circuits whereby the energization of said electro-magnetic means is controlled by the current in the second-named circuit.

6. The combination with a plurality of circuits, of electro-magnetic means having opposed windings, each of said windings connected in one of said plurality of circuits, a source of alternating current for energizing said circuits, a second plurality of circuits, an electron discharge device in each of said second plurality of circuits, means for maintaining a normal potential relation between the grids and cathodes of said electron discharge devices, temperature sensitive means for changing said relation, and an inductive coupling between each of said first and second-named circuits comprising a transformer whereby the energization of each of said windings is controlled by the current in one of said second-named circuits.

7. In combination with means for producing a potential bearing a functional relation to the magnitude of a variable, of means sensitive to changes in said potential, an electron discharge device having a cathode, grid, and anode, means for maintaining a normal potential relation between said grid and cathode, and means for changing said potential for a period of time proportional to the change in magnitude of said first-named potential.

8. A temperature measuring device comprising a plurality of electron discharge devices each provided with an input and an output circuit, a plurality of temperature responsive means adapted to successively control the energization of said input circuits, a movable member for advising temperature magnitude, and electro-magnetic means for exerting opposing forces on said member, the energization of said electro-magnetic means controlled by the current in said output circuits.

9. The combination with a heating device of means responsive to the temperature thereof, a pair of electron discharge devices having electrical input and output circuits, said first-named means adapted to control said input circuits, recording means controlled by the current in said output circuits and for advising the temperature, and control means for said heating means operated in unison with said recording means.

10. In combination with means for producing an electrical potential representative of the magnitude of a variable, a plurality of electron discharge devices each having an input and an output circuit, said first-named means adapted to control the energization of said input circuits, indicating means of the value of the variable controlled by the current of said output circuits, and control means for regulating the rate of application of an agent to vary the magnitude of said variable operated in unison with said indicating means.

11. In combination with means for producing a potential bearing a functional relation to the magnitude of a variable, of movable means sensitive to changes in said potential, an electron discharge device having a cathode, a grid, and an anode, means for maintaining a normal potential relation between said grid and cathode, and means cooperating with said second-named means for periodically changing said normal potential relation for increments of time proportional to the deviation of said second-named means from a predetermined position.

12. The combination with a movable member of an electron discharge device having a grid, a cathode, and an anode, means for maintaining a normal potential relation between said grid and cathode, and means cooperating with said movable member for periodically changing said normal relation for increments of time proportional to the amount of deviation of said movable member from a predetermined position.

13. In combination with a potentiometer circuit comprising a source of current, a slide wire resistance, and a variable resistance; of a movable member for varying said last-named resistance, electromagnetic means for exerting opposing forces on said member, and means for automatically controlling the energization of said electromagnetic means to maintain a constant potential difference across said slide wire.

14. The combination with a potentiometer circuit comprising a source of current, a slide wire resistance, and a variable resistance; of a movable member for varying said last-named resistance, electromagnetic means for exerting opposing forces on said member, a galvanometer and a source of current for determining the potential difference across said slide wire, a pair of electron discharge devices having input and output circuits, a transformer connected in each of the output circuits and electrically coupling said electromagnetic means with said output circuits, the input circuits of said electron discharge devices controlled by said galvanometer to maintain a constant potential difference across the slide wire resistance.

15. The combination with a deflecting member of a pair of electron discharge devices each having a grid, a cathode, and an anode; means for maintaining a normal potential relation between the grid and cathode in each of said electron discharge devices, mechanism connected in the output circuits of said devices and adjusted in one direction upon a change from the said normal potential relation of one of said electron discharge devices and adjusted in the opposite direction upon a change from the said normal potential relation of the other of said electron discharge devices, and means controlled by said mechanism for changing the deflection of said movable member.

16. A temperature measuring apparatus comprising in combination, a plurality of electron discharge devices each provided with an electrical input and an output circuit, temperature responsive means for controlling the energization of the input circuits, operating mechanism connected in the output circuits of said electron discharge devices, and means controlled by said mechanism for modifying the control of the input circuits by said temperature responsive means.

17. In combination, a deflecting member, a plurality of electron discharge devices each having an electrical input and an output circuit, the deflection of said member controlling the energization of said input circuits, operating mechanism actuated by the current in said output circuits, and means under the control of said operating mechanism for varying the deflection of said member.

18. A temperature responsive device comprising in combination, a thermocouple, a pair of electron discharge devices each having an electrical input and an output circuit, operating mechanism in the output circuits of said electron discharge devices actuated upon a change in space current through either of said electron discharge devices, and means under the joint control of said thermocouple of said operating mechanism for controlling the energization of said input circuits.

19. In a control system for producing or maintaining a predetermined condition, in combination, a member having a neutral position and movable therefrom in accordance with deviations from said predetermined condition, an electron discharge device controlled by said member, regulating means for varying the application of an agent to maintain said condition controlled by said electron discharge device, and means controlled by the electron discharge device for restoring said member to the neutral position before said predetermined condition is established.

20. In combination, a member normally free to deflect from a neutral position, means for periodically rendering said member immovable, a periodically reciprocated arm adapted to engage said member while the member is immovable for increments of time bearing a functional relation to the deflection of the member from its neutral position, an electron discharge device having a grid, a cathode, and an anode, means for maintaining a normal potential relation between said grid and cathode, and means made effective upon engagement of said arm and member for modifying said potential relation.

21. In combination, a deflecting member, a periodically reciprocated arm adapted to engage said member for increments of time bearing a functional relation to the deflection of said member from a predetermined position, an electron discharge device having a grid, a cathode, and an anode, means for maintaining a potential relation between said grid and cathode, and means for modifying said relation rendered effective upon engagement of said arm and member.

22. In combination, a deflecting member having a neutral position, a pair of swinging arms periodically reciprocated toward and away from each other, one of said arms adapted to engage the member for increments of time bearing a functional relation to the amount of deflection of said member in one direction from said neutral position, the other of said arms adapted to engage the member for increments of time bearing a functional relation to the amount of deflection of said member in the other direction from the neutral position, a pair of electron discharge devices each having a grid, a cathode, and an anode, means for maintaining a potential relation between the grid and cathode of each device, and means for modifying the grid-cathode relation of one of said devices upon engagement of one of said arms with said member, and for modifying the grid-cathode relation of the other of said devices upon engagement of the other of said arms with said member.

23. In combination, means for producing a potential, a galvanometer having a deflecting member positioned in accordance with the magnitude of said potential, a pair of scissors arms